United States Patent
Kakiwaki

(10) Patent No.: US 8,494,495 B2
(45) Date of Patent: Jul. 23, 2013

(54) MOBILE INFORMATION TERMINAL

(75) Inventor: Yuka Kakiwaki, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 245 days.

(21) Appl. No.: 12/521,771

(22) PCT Filed: Dec. 28, 2007

(86) PCT No.: PCT/JP2007/075323
§ 371 (c)(1),
(2), (4) Date: Jul. 30, 2009

(87) PCT Pub. No.: WO2008/081945
PCT Pub. Date: Jul. 10, 2008

(65) Prior Publication Data
US 2010/0105365 A1   Apr. 29, 2010

(30) Foreign Application Priority Data

Dec. 28, 2006 (JP) ................. 2006-354040
Dec. 28, 2006 (JP) ................. 2006-354042

(51) Int. Cl.
*H04M 3/42* (2006.01)
(52) U.S. Cl.
USPC ...... 455/414.1; 455/566; 455/66.1; 455/90.3; 455/466; 455/575.1
(58) Field of Classification Search
USPC ............ 455/414.1, 466, 566, 66.1, 90.3, 455/556.2, 575.1; 709/217; 379/440; 707/758, 707/251, 5
See application file for complete search history.

(56) References Cited

U.S. PATENT DOCUMENTS

| 7,596,760 B2 * | 9/2009 | Sauve et al. | 715/777 |
| 7,840,579 B2 * | 11/2010 | Samuelson et al. | 707/758 |
| 2005/0015726 A1 * | 1/2005 | Tuominen | 715/733 |

FOREIGN PATENT DOCUMENTS

| JP | 11-282864 | * 10/1999 |
| JP | 2003-162355 | * 6/2003 |
| JP | 2003-283635 | 10/2003 |

OTHER PUBLICATIONS

International Search Report for PCT/JP2007/075323, mailed Feb. 12, 2008, 1 page.
English translation of JP Office Action, Patent Application No. 2008-552193, dated May 22, 2012.

* cited by examiner

*Primary Examiner* — Manpreet Matharu
(74) *Attorney, Agent, or Firm* — Duane Morris LLP

(57) ABSTRACT

A mobile information terminal with improved operability, having a display part and a control part. The display part has a first display region and a second display region. In the first display region, information for specifying a function is displayed. In the second display region, information on conditions of a function executed by a function execution section is displayed. The control part displays the function specifying information in a standby state where the display of the execution information in the second display region of the display part is suppressed and also displays standby information, different from the execution information, in the second display region. In the standby state, when function specifying information is selected in response to the operation detected by an operation detection part, the control part displays execution information of the function specified by the function specifying information selected while the display of the function specifying information on the first display region is maintained.

8 Claims, 7 Drawing Sheets

MOBILE INFORMATION TERMINAL

CROSS-REFERNCE TO RELATED APPLICATIONS

This application is a U.S. National Phase Application of International Application No. PCT/JP2007/075323 filed Dec. 28, 2007, which claims priority to Japanese Application No. 2006-354040 filed Dec. 28, 2006 and Japanese Application No. 2006-354042 filed Dec. 28, 2006, the disclosures of which are incorporated herein by reference in their entirety.

1. Technical Field

The present invention relates to a mobile phone or other mobile information terminal configured so as to be able to execute a plurality of functions.

2. Background Art

In recent mobile phones, along with the greater sophistication of their functions, further improvement of operability is being demanded. As prior art aimed at improvement of operability, for example, there is known a mobile information terminal displaying icons representing clock display, calendar display, posted memo, and other functions at a display part at the time of the standby state and executing a corresponding function when an icon is selected in response to an operation on the operation part.

Further, there is also known a mobile information terminal displaying tabs corresponding to functions on a liquid crystal monitor in response to an operation on the operation part and displaying corresponding settings on the liquid crystal monitor when a tab is selected in response to an operation on the operation part (see, for example, Patent Document 1).

Patent Document 1: Japanese Patent Publication (A) No. 2003-283635

DISCLOSURE OF THE INVENTION

Problem to be Solved by the Invention

In a mobile phone or other mobile information terminal, however, usually, it is limited to mount a small display part thereon, as a result, the region for displaying the icons on the display part is limited to small, so the operability cannot always be improved.

Further, in the mobile information terminal disclosed in Patent Document 1 as well, an operation on an operation part for displaying tabs corresponding to functions on a liquid crystal monitor is additionally necessary, therefore it is limited the improvement of the operability.

The present invention provides a mobile information terminal capable of improving the operability.

Means for Solving the Problem

A mobile information terminal of a first aspect of the present invention has: an operation detection part for detecting an operation; a function execution part for executing a plurality of functions; a display part having a first display region in which function specifying information specifying a function is displayed and a second display region in which execution information indicating an execution state of the function which is executed by the function execution part is displayed; and a control part which displays the function specifying information in the first display region in a standby state where display of the execution information in the second display region in the display part is suppressed and which displays standby information, which is information different from the execution information, in the second display region.

The control part displays the execution information of the function specified by the selected function specifying information in the second display region in a state where display of the function specifying information in the first display region is maintained when the function specifying information is selected in response to an operation detected by the operation detection part in the standby state.

Preferably, the control part displays a plurality of function specifying information in the first display region and displays selected function specifying information in the first display region emphasized compared with other function specifying information.

Preferably, the control part executes the function specified by the selected function specifying information by the function execution part in response to an operation when an operation is detected by the operation detection part in a state where the function specifying information is selected.

Preferably, the execution information may be changed in accordance with the execution state of a function executed by the function execution part, and the control part displays the changed execution information in the second display region when a function is executed by the function execution part and the execution information is changed and the executed function is ended or interrupted.

Preferably, the mobile information terminal of the invention further has a communication part, the function execution part may execute a reception function of receiving a signal through the communication part, and the execution information may be changed based on the signal received due to execution of the reception function by the function execution part.

Preferably, when a function executed by the function execution part is ended, the control part displays in the first display region the function specifying information which had been displayed in the first display region immediately before the execution and displays in the second display region the execution information which had been displayed in the second display region.

Preferably, when a function executed by the function execution part is interrupted, the control part displays in the first display region first interrupted function information specifying the function whose execution by the function execution part was interrupted and displays in the second display region second interrupted function information indicating the execution state of the function whose execution was interrupted.

Preferably, when an operation is detected by the operation detection part and second interrupted function information is selected in a state where the second interrupted function information is displayed in the second display region, the control part re-starts execution of the interrupted function which corresponds to the selected second interrupted function information.

Preferably, when selection is released in response to an operation detected by the operation detection part in a state where the function specifying information is selected, the control part displays the standby information in the second display region.

Effects of the Invention

According to the present invention, a mobile information terminal for which improvement of operability is achieved, is provided.

EXPLANATION OF NOTATIONS

1 ... tab display region, 2 ... sheet display region, 3 ... soft key display region, 10 ... mobile phone, 11 ... communication part, 12 ... control part, 13 ... storage part, 14 ... audio processing part, 15 ... speaker (SP), 16 ... microphone (MIC), 17 ... display part, 18 ... operation part, 120 ... main control part, 121 ... application execution control part, 122 ... standby display content update control part, 123 ... discrimination flag update control part, 124 ... display control part, 131 ... tab discrimination storage table, 132 ... system save region, 1311 ... tab number, 1312 ... standby display content, and 1313 ... tab discrimination flag.

Best Mode for Carrying Out the Invention

Figure 1:
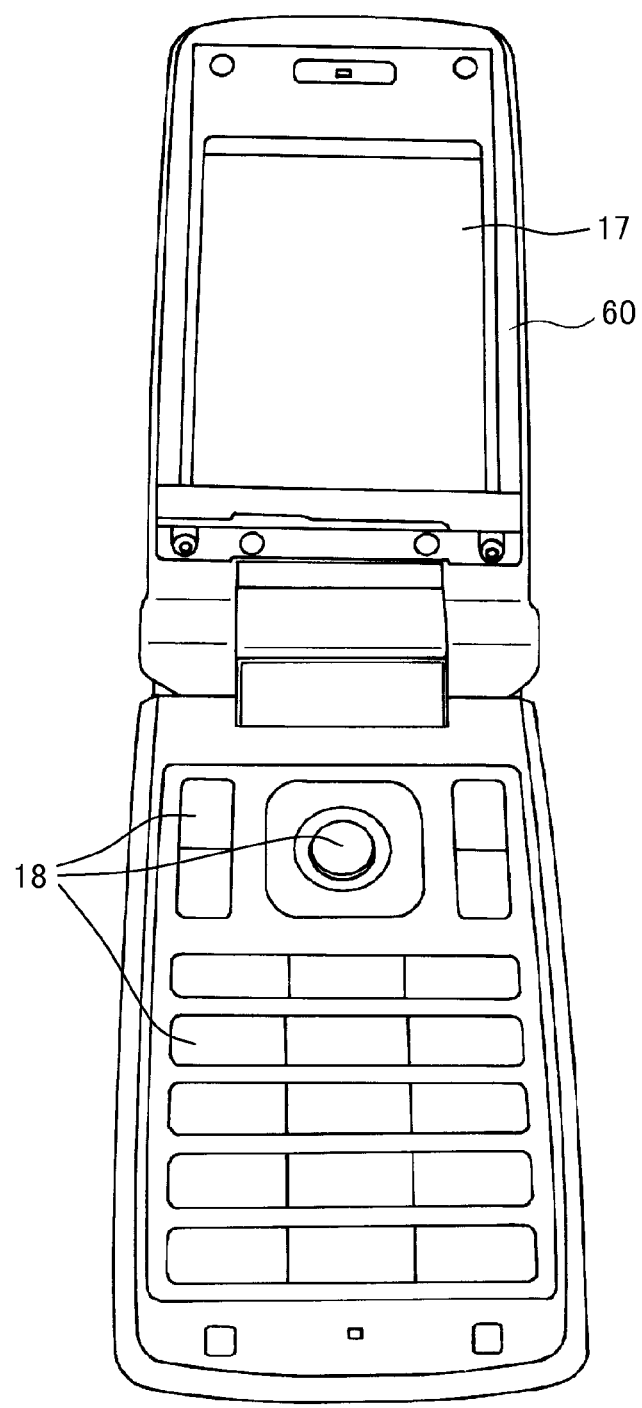
FIG. 1 is a view of the outer appearance of a mobile information terminal according to an embodiment of the present invention.
Figure 2:
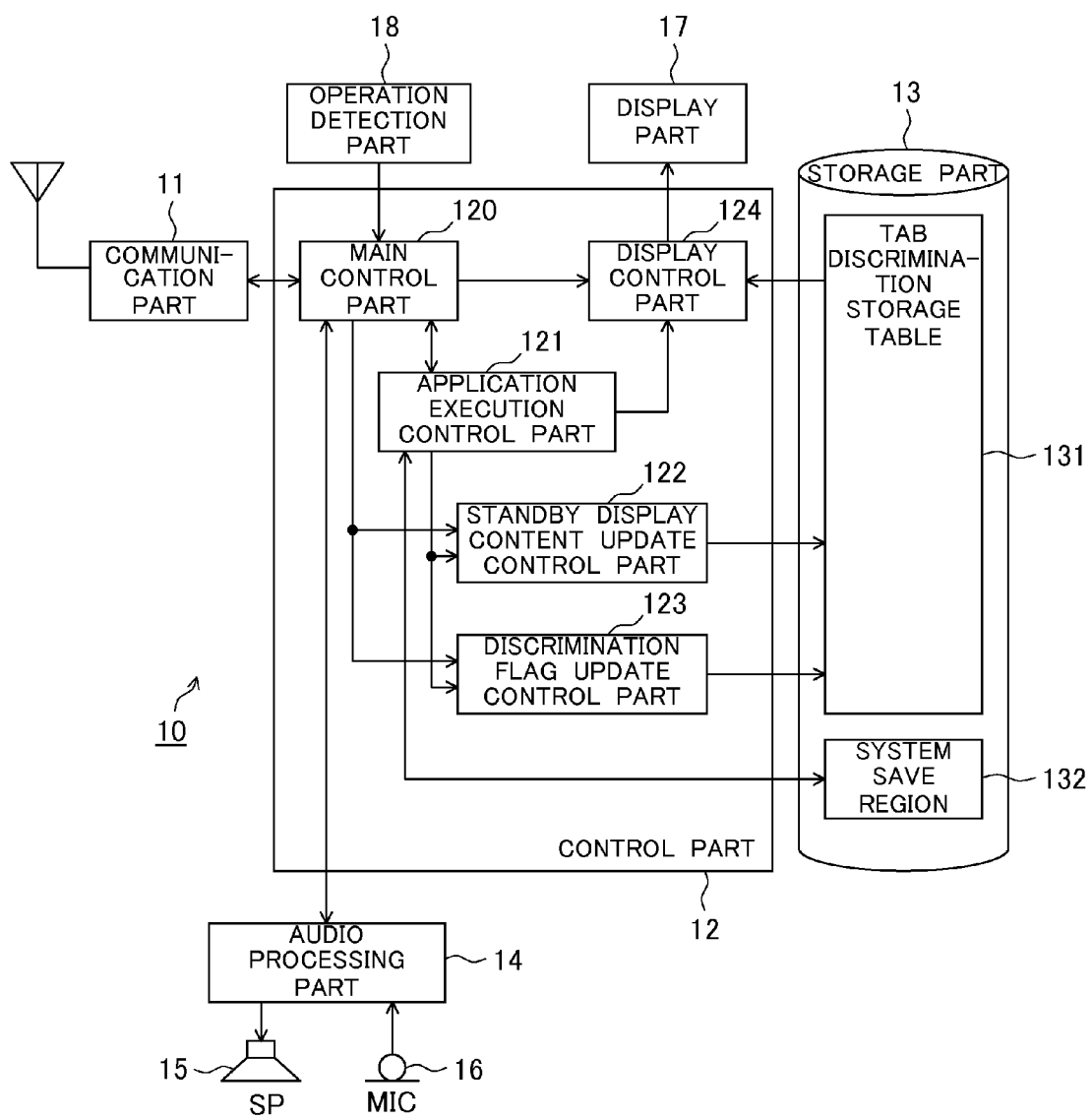
FIG. 2 is a block diagram of the internal configuration of the mobile information terminal according to the embodiment of the present invention.

FIG. 1 is a view of the outer appearance of a mobile information terminal according to an embodiment of the present invention, while FIG. 2 is a block diagram showing the internal configuration of the mobile information terminal according to the embodiment of the present invention. Here, a mobile phone 10 is illustrated as a mobile information terminal of the present invention.

As shown by FIG. 1 and FIG. 2, the mobile phone 10 is configured by a communication part 11, control part 12, storage part 13, audio processing part 14, speaker 15 (SP), microphone 16 (MIC), display part 17, and operation detection part 18.

Further, the mobile phone 10 is configured by a case having the display part 17 and a case having the operation detection part 18 which are connected to each other so that they can be opened and closed.

The communication part 11 receives and transmits signals through an antenna with a not shown base station. More specifically, the communication part not only sends and receives calls through the antenna, but also connects with a desired server to download web pages and receive information distributed simultaneously to large numbers of specific users (multi-cast) (hereinafter referred to as "communication").

The control part 12 is a central processing unit performing various types of control of the mobile phone 10. Details will be explained later.

The storage part 13 stores various types of data utilized for processing at the control part 12. For example, the storage part 13 holds programs of a computer provided in the control part 12, an address book for managing personal information such as phone numbers and e-mail addresses of other parties of communication through the communication part 11, an audio file for playing back an incoming call sound and an alarm sound, an image file displayed in the display part 17 at standby, various types of setting data, temporary data utilized in the processing process of the programs, and so on.

Further, as a characterizing configuration of the present invention, the storage part 13 has a later explained tab discrimination storage table 131 and a system save region 132. Note that, the storage part 13 is configured by, for example, a nonvolatile memory device (nonvolatile semiconductor memory, hard disc device, optical disc device, etc.), a random accessible memory device (for example, SRAM or DRAM), or the like.

Figure 4:
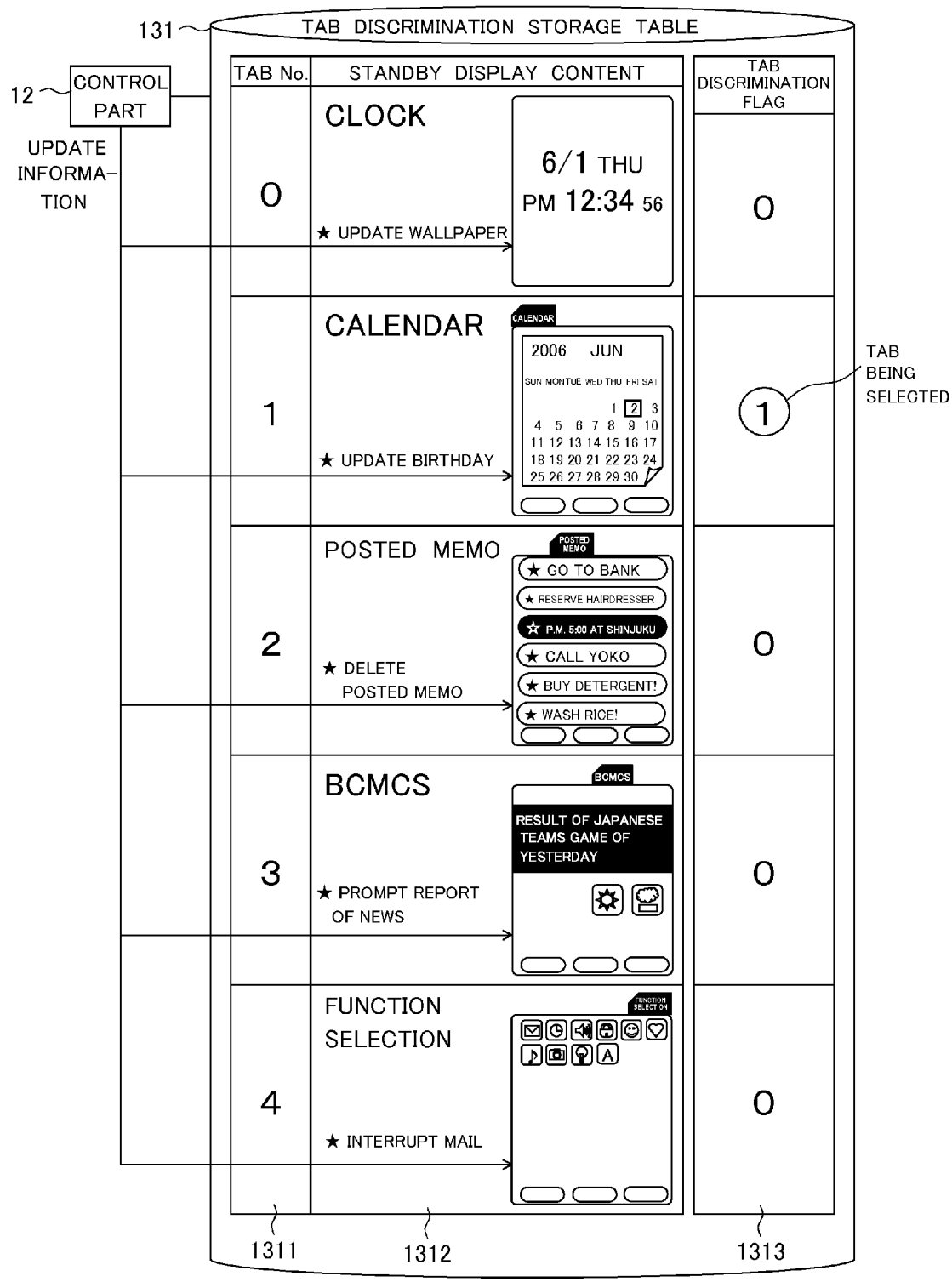
FIG. 4 is a view showing an example of a data structure of a tab discrimination storage table.

The tab discrimination storage table 131, as shown in FIG. 4 showing an example of the data structure, is a memory region storing the tab number (tab no.) 1311, display content 1312, and tab discrimination flag 1313 linked with each other.

Here, the tab number 1311 means a number specifying a tab (function specifying information) displayed in the tab display region 1 (first display region) of the display part 17 explained later. The standby display content 1312 means information displayed in the sheet display region 2 (second display region) in the display part 17 in the standby state explained later in the same way, while the tab discrimination flag 1313 means a flag showing (indicating) whether or not the tab displayed in the tab display region 2 is selected in response to the operation detected by the operation detection part 18.

The system save region 132 stores data being processed of an application immediately before interruption, system information, etc. in a case when an application program ((function), hereinafter simply referred to as an "application") is executed, communication is carried out through the communication part 11, and the application being executed is interrupted (hereinafter, communication through the communication part 11 during execution of an application will be referred to as an "event").

The audio processing part 14 performs processing on an audio signal output at the speaker 15 and an audio signal input at the microphone 16. Namely, the audio processing part 14 amplifies audio input from the microphone 16, performs analog-to-digital conversion, and further applies encoding or other signal processing to this to convert it to digital audio data which it then outputs to the control part 12. Further, the audio processing part 14 applies decoding, digital-to-analog conversion, amplification, or other signal processing to the audio data supplied from the control part 12 to convert it to an analog audio signal which it then outputs to the speaker 15.

The display part 17 is configured by using, for example, a liquid crystal display panel, an organic EL (electro-luminescence) panel, or other display device and displays an image (FIG. 3 etc.) in accordance with a video signal transmitted from the control part 12.

The display part 17 displays, for example, a phone number of a destination at the time of a send (call) operation, a phone number of a phone of the other party at the time of reception, contents of received mail and transmitted mail, the date, time, remaining battery power, success or failure of a send operation, a standby screen, and other various information and images.

Further, the operation detection part 18 has, for example, a power key, speak key, number keys, letter keys, direction keys, an execute key, a send key, one-touch key explained before, and other keys to which various functions are assigned. When these keys are operated by the user, the operation detection part 18 detects that operation, generates signals corresponding to detection results, and transmits these as the operation of the user to the control part 12.

The control part 12, as shown in FIG. 2 showing the internal configuration in terms of functions, has a main control part 120, application execution control part 121, display content update control part 122, discrimination flag update control part 123, and display control part 124.

The main control part 120 controls the application execution control part 121, display content update control part 122, discrimination flag update control part 123, and display control part 124.

The application execution control part (function execution part) 121 has the function of executing a plurality of applications for a clock, calendar, posted memo, communication, function switching, etc. Further, the application execution control part 121 performs control of start, execution, interruption, or ending of the executed application by using the information stored in the system save region 132 in the storage part 13.

The standby display content update control part 122 performs control for changing the information to be displayed in the sheet display region 2 in accordance with the execution state of the function stored in the standby display content 1312 of the tab discrimination storage table 131 in the storage part 13 and executed by the application execution control part 121.

The discrimination flag update control part 123 performs control for updating the tab discrimination flag 1313 showing the selection state of the tab provided corresponding to each standby display content 1312 of the tab discrimination storage table 131 in the storage part 13.

The display control part 124 controls the display of the display part 17 in accordance with the storage state of the tab discrimination storage table 131 in the storage part 13.

Note that, the application execution control part 121, display content update control part 122, discrimination flag update control part 123, and display control part 124 may be physically configured separately from each other in the control part 12 or may not be.

Figure 3:
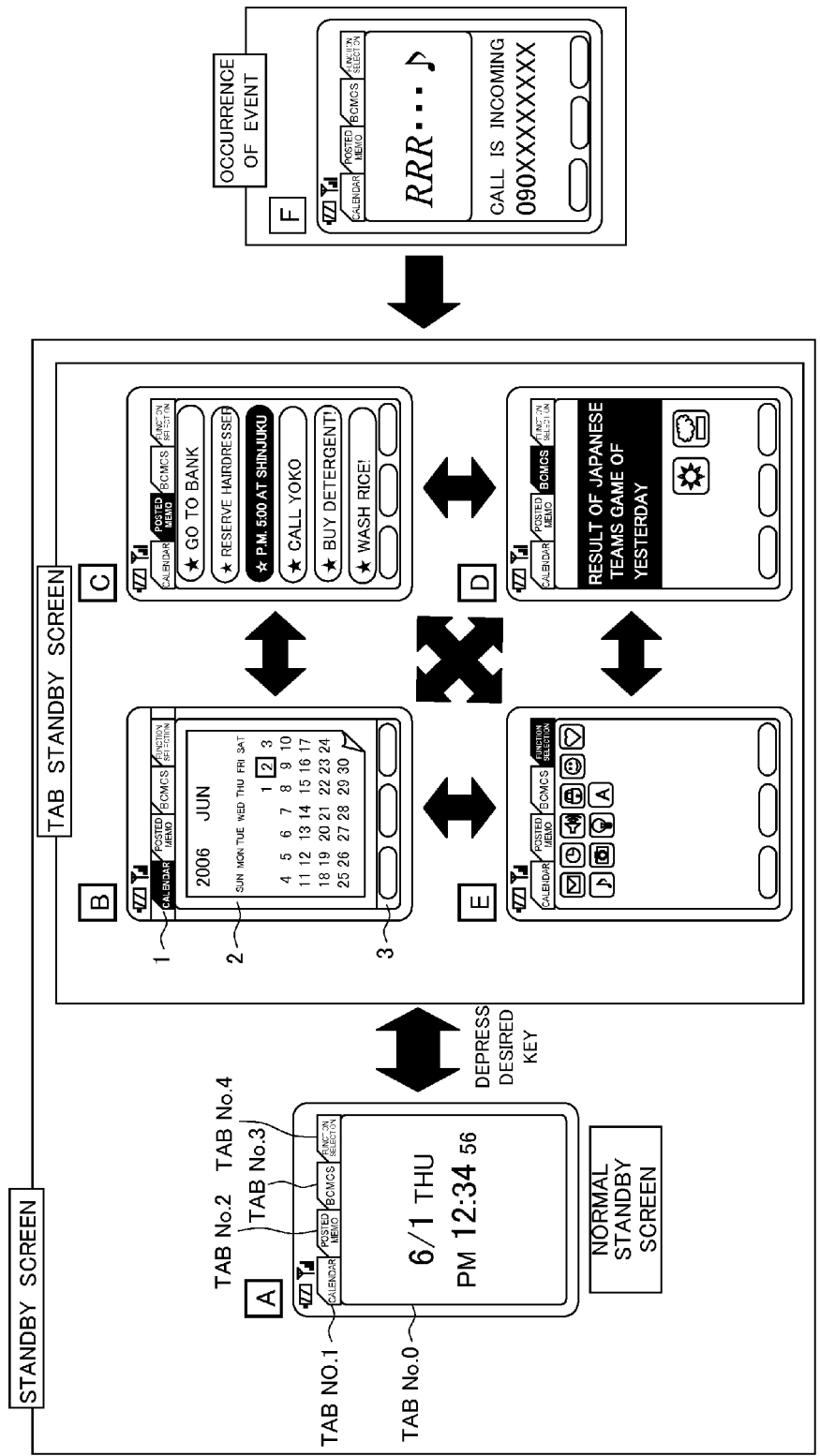
FIG. 3 is a view showing a state of change of a display content of a display part of the mobile information terminal.

Next, the display control of the mobile phone 10 according to the embodiment of the present invention will be explained by using FIG. 3. FIG. 3 is a diagram showing the state of change of the display content of the display part 17 along with the display control by the display control part 124 of the mobile information terminal.

As shown in FIG. 3, the display part 17 of the present invention has a tab display region 1, a sheet display region 2, and a soft key display region 3 controlled in display based on the control of the display control part 124.

In the tab display region 1, as shown in FIG. 3 as well, information (function specifying information) for specifying a calendar tab (tab no. 1), a posted memo tab (tab no. 2), a BCMCS (Broadcast/Multicast Service) tab (tab no. 3), a function selection tab (tab no. 4), and other plurality of applications is displayed.

Note that, when any tab among the tabs displayed in the tab display region 1 is selected in response to an operation detected by the operation detection part 18, that selected tab is displayed while changing its color with respect to the other tabs (is displayed emphasized).

Due to this, the user can easily discriminate the selected tab. Note that, the tab is displayed in the tab display region 1 in the standby state as well. Further, when the user decides on the selected tab by further operating the operation detection part 18, the application specified by the tab is executed. Due to this, the user can easily execute an application from the standby state.

In the sheet display region 2, when a tab is selected in response to an operation of the direction key, one-touch key, or other operation detection part linked with each tab, information showing the execution state of the application specified by that selected tab (execution information) is displayed.

For example, on a tab standby screen B of FIG. 3, the execution information of a calendar application specified by the calendar tab is displayed. The execution information of a posted memo application (operation detection part by the user) specified by the posted memo application is displayed on a tab standby screen C, execution information of a BCMCS application (one type of application using the communication part 11) specified by the BCMCS is displayed on a tab standby screen D, and execution information of the function switching application specified by the function selection tab is displayed on a tab standby screen E.

Note that, the information showing the execution state of the application is configured so that a change in accordance with the execution state thereof is possible. For example, in the function switching application, as shown on the tab standby screen E of FIG. 2, as the information showing the execution state of the application, information concerning the function selected based on the operation of the user with respect to the operation detection part 18 is displayed in the sheet display region 2. However, the information concerning this selected function is changed based on an operation with respect to the detection part 18. Therefore, as a result, the information showing the execution state of the application will be changed as well.

Further, the information showing the execution state of the application is configured so that also a change based on a signal received through the communication part 11 is possible. For example, in the BCMCS application, as shown on the tab standby screen D of FIG. 2, as the information showing the execution state of the application, simultaneous distribution information received through the communication part 11 is displayed in the sheet display region 2. However, the function concerning this selected function is changed or added each time the simultaneous distribution information is received through the communication part 11. Therefore, as a result, the information showing the execution state of the application will be changed as well.

Further, when information showing the execution state of the application is changed, the display control part 124 displays information after change in the sheet display region 2 with a higher priority than information before change. Due to this, the user can continuously confirm information showing the execution state of an application after a change on which an intent of the user and the operation result are best reflected based on the display of the sheet display region 2.

Further, in the sheet display region 2, standby information different from the information showing the execution state of the application is displayed when display of information showing the execution state of the application is suppressed based on an operation on a power key etc. detected by the operation detection part 18. For example, on the tab standby screen A of FIG. 3, based on an operation on the power key etc. detected by the operation detection part 18, the selected tab is released and the standby information of the clock is displayed in the sheet display region 2.

Note that, an event occurrence screen F of FIG. 3 shows a state of the display part 17 where an incoming call or other event involving the communication part 11 occurs. When an event occurs in this way, the display control part 124 maintains the display itself of the tab in the tab display region 1, while displaying the display content corresponding to the occurring event in the sheet display region 2. On the event occurrence screen F of FIG. 3, a phone number of a phone of the other party is displayed in the sheet display region as the display content corresponding to the occurring event.

In the soft key display region 3, a suitable soft key matching with the display content of each sheet is displayed.

Figure 5:
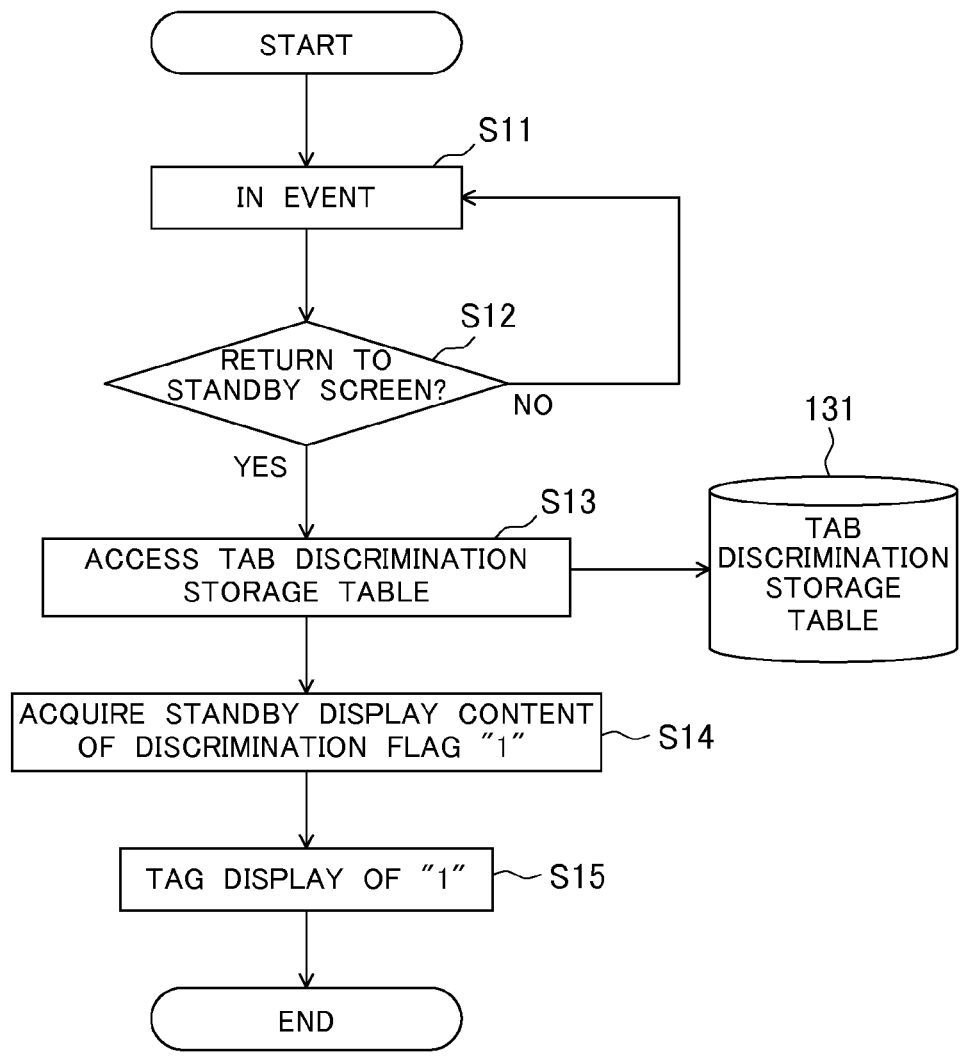
FIG. 5 is a flow chart showing a flow of access processing of the tab discrimination storage table.
Figure 6:
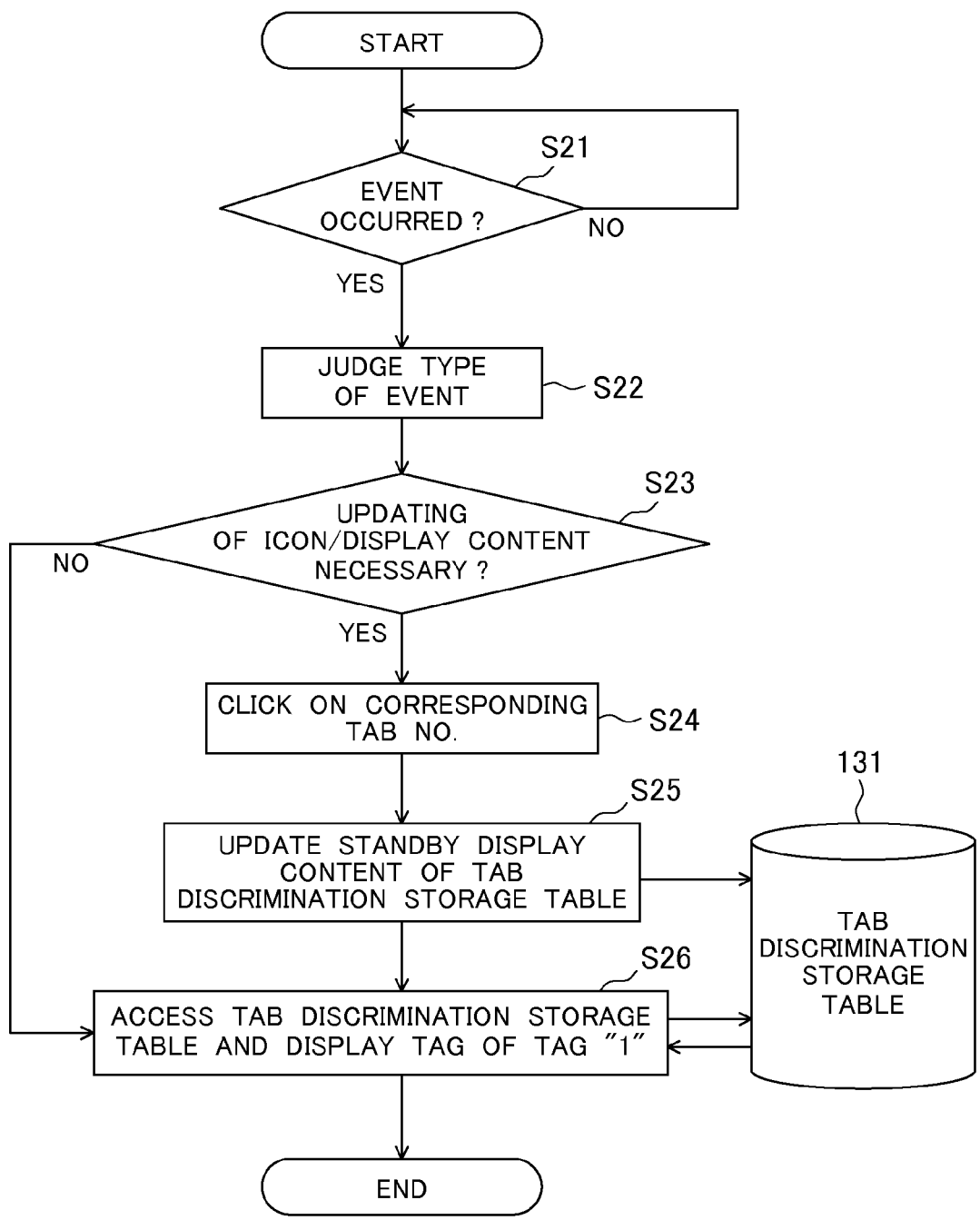
FIG. 6 is a flow chart showing a flow of update processing of standby display content of the tab discrimination storage table.

Below, the operation of the mobile phone 10 according to the present embodiment with reference to the flow charts of FIG. 5 and FIG. 6 will be explained in detail. FIG. 5 and FIG. 6 are flow charts showing the operation of the mobile phone 10 and show flows of processing of the access processing of the tab discrimination storage table 131 and the change processing of the information showing the execution state of the application.

The mobile phone 10 stores the fact that tab was selected, and that standby display content was displayed by the discrimination flag update control part 123 setting the tab discrimination flag 1313 to ON "1" in accordance with the function executed under the control of the application execution control part 121.

The flow chart of FIG. 5 has as its starting point the point of time when an event occurs and an execution screen corresponding to this event is shifted to from the state where the normal standby screen indicated by notation A in FIG. 3 or the tab standby screen indicated by any of notations B to E is displayed.

The control part 12 (main control part 120) starts the application execution control part 121 when detecting occurrence of an event. The application execution control part 121 executes the application required for processing of the event. Next, the control part 12 judges if there is a necessity of changing the information showing the execution state of the application of either of the standby screens A to E due to the occurring event. Here, when it is judged that change is necessary, as shown by the flow chart of FIG. 6, the information showing the execution state of the application which is generated by the application execution control part 121 is changed, and the content of the tab discrimination storage table 131 is updated (here, S11: shown as "during event"). The change processing of the information showing the execution state of the application will be explained later with reference to the flow chart of FIG. 6.

On the other hand, when expiration of the time or depression of a speak end key of the operation detection part 18 is detected and all applications are ended or interrupted (S12 "Yes")) and for example the event occurrence screen F is switched to the standby screens A to E, the application execution control part 121 accesses the tab discrimination storage table 131 of the storage part 13 and refers to the content of the tab discrimination flag 1313 (S13).

Then, the application execution control part 121 starts the display control part 124.

The started display control part 124 reads out the information showing the execution state of the application from the standby display content 1312 for which "1" is set in the tab discrimination flag 1313 (S14) and displays the read out information showing the execution state of the application together with the tab in the display part 17 (S15). Note that, at this time, the corresponding tab is displayed in the tab display region 1 emphasized compared with the other tabs.

Next, the flow of the processing at the time of updating the tab display content will be explained with reference to the flow chart shown by FIG. 6.

When an event occurs (S21 "Yes"), the main control part 120 judges type of event and starts the application execution control part 121 (S22), then the application execution control part 121 executes the corresponding application. Then, the application execution control part 121 judges whether or not the information showing the execution state of the application must be changed along with the occurrence of the event (S23).

As a result, if it was judged that the information must be changed (S23 "Yes"), the application execution control part 121 determines a tab number 1311 corresponding to this application and starts the display content update control part 122 (S24).

Then, the display content update control part 122 refers to the tab discrimination storage table 131 based on the tab number 1311 determined by the application execution control part 121 and changes the information showing the execution state of the application in the standby display content 1312 of the tab discrimination storage table 131 based on the information judged to be have to be changed by the application execution control part 121 in the same way (S25).

FIG. 4 shows an example of the processing where the application execution control part 121 judges that updating of the display content is necessary. Here, the case where the application execution control part 121 judges that a change of the display content is necessary means, for example, a case where wallpaper is changed by execution of the clock application, a case where setting of a birthday is changed by execution of the calendar application, a case where a posted memo is deleted by execution of the posted memo application, a case where the newest news is received by execution of the BCMCS application, a case where a mail interruption processing is requested by execution of the function switching application, and other cases.

In such case, the application execution control part 121 turns the tab discrimination flag of the tab corresponding to the executed application ON ("1"). Note that, in FIG. 4, the black tab or black portion is the information showing the execution state of the application and becomes the target of updating changed in this way.

Note that, when the application which has been executed by the application execution control part 121 is interrupted due to occurrence of mail interruption processing etc., the control part 121 stores content input by the operation on the operation detection part 18 immediately before the interruption, the system state at that time, and other information required for restoration of the system in the system save region 132 of the application storage part 13 under the control of the main control part 120. Then, when interruption of the application is requested based on the operation for the operation detection part 18, the application execution control part 121 reads out various types of information stored in the system save region 132, restores the system state immediately before the interruption of the application, and re-starts the execution of the application.

The main control part 120 starts the display control part 124 when the information showing the execution state of the application is changed (S25) or when it is judged that updating of the display contents of the standby screens A to E and icons is not necessary (S23 "No"). The started display control part 124 reads out the standby display content (sheet) for which "1" is set at the tab discrimination flag 1313, reads out information showing the execution state of the application from the corresponding standby display content 1312 from among those indicated by notations A to E, and displays this in the display part 17 (S26).

In this way, information showing execution states of a plurality of applications which was valid before occurrence of an event is displayed after the end of the event. Further, the information showing the execution state of an application which was changed during occurrence of an event is displayed with a higher priority than the information showing the execution state of the changed application.

As explained above, according to the mobile phone 10 of the present embodiment, when a tab is selected in response to an operation detected by the operation detection part 18 in the standby state, the control part 12 displays, in the sheet display region 2, information showing the execution state of the application specified by the tab selected in a state where the tab display in the tab display region 1 is maintained, whereby an improvement of the operability is achieved even in the standby state having the highest usage frequency of the user.

Accordingly, disorderly arrangement of many icons in the display part 17 as in the past is suppressed, and the display content of the display part 17 is cleaned up. Further, even in a case where only a small display region is provided as in the mobile phone 10, large number of information is arranged and displayed in the display part 17 in the standby state. Further, a plurality of applications can be switched among just by selecting a tab by operation of the operation detection part 18, therefore the display content of the display part 17 can be easily changed.

Further, information showing the execution state of an application changed during occurrence of an event is displayed with a higher priority than information showing the execution state of the changed application, therefore the user can easily confirm the information showing the execution state of the newest application.

Note that, according to the embodiment of the present invention described above, only the mobile phone 10 was illustrated as mobile information terminal of the present invention. However, the invention is not limited to the mobile phone 10, and can be applied to a PDA (personal digital assistant), game machine etc. in the same way.

Further, the functions of the constituent blocks of the mobile information terminal of the present invention may all be realized by software or at least a portion may be realized by hardware. For example, the processing in the control part 12 and the data processing in the communication part 11 and the audio processing part 14 may be realized on a computer by one or more programs. Further, at least a portion may be realized by hardware as well.

Further, the tabs in the present embodiment included a calendar tab (tab no. 1), posted memo tab (tab no. 2), BCMCS (Broadcast/Multicast Service) tab (tab no. 3), and function selection tab (tab no. 4), but the present invention is not limited to this, and may include tabs corresponding to the other applications as well.

Further, the tabs may include not only tabs corresponding to applications, but also a tab specifying an interrupted application (first interrupted function information). Note that, the state where an application is interrupted means that the executed application is not ended, but the information showing the execution state of the application is not displayed in the sheet display region 2 and execution of that is temporarily suspended. Namely, when the application which has been executed is interrupted by the control of the application execution control part 121, the tab specifying that interrupted application may be displayed in the display part 17 in the standby state as well.

Figure 7:
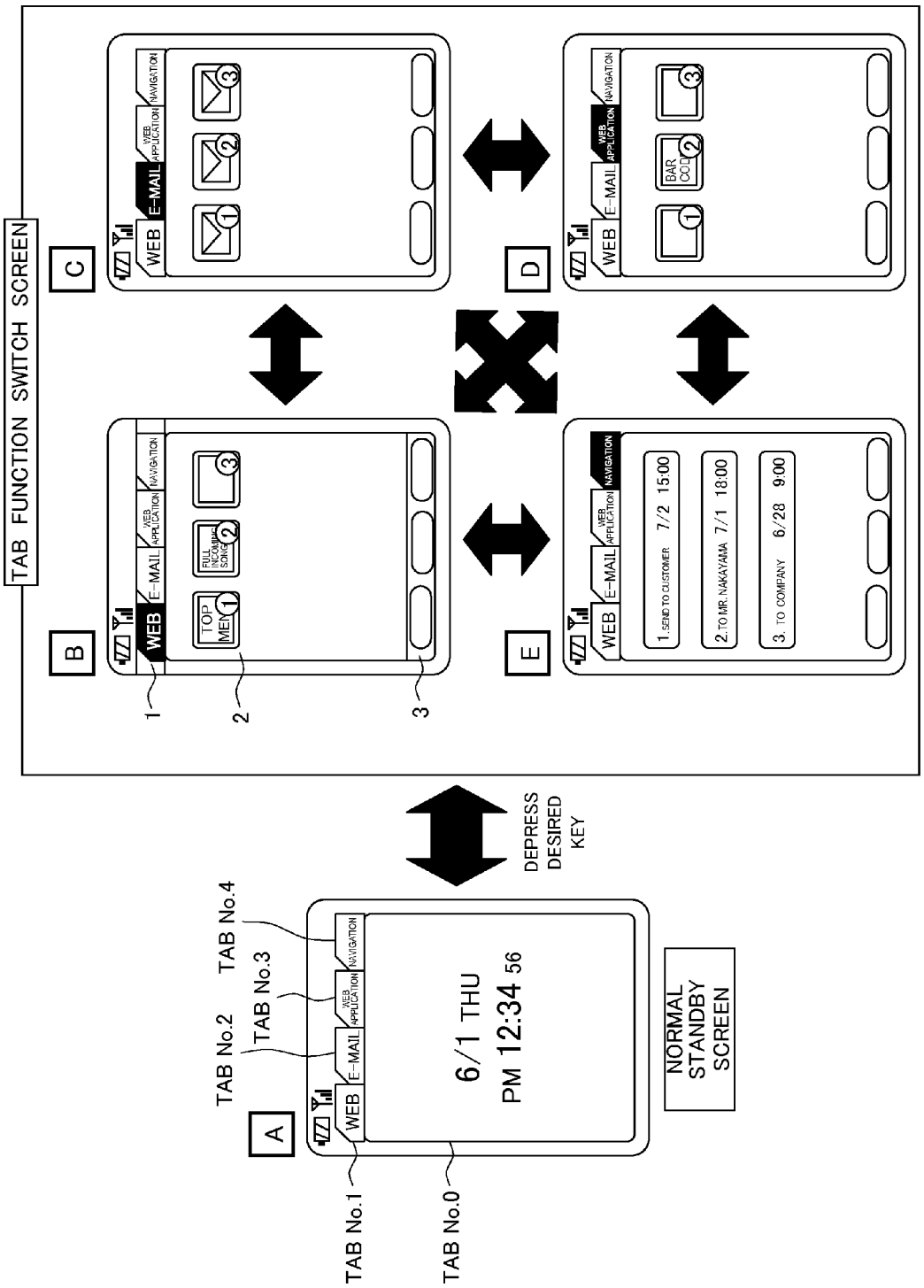
FIG. 7 is a view showing a modification of the present embodiment.

For example, as shown by FIG. 7, in the tab display region 1, information specifying a plurality of applications being interrupted (function specifying information) such as a web tab (tab no. 1), e-mail tab (tab no. 2), web tab (tab no. 3), and navigation tab (tab no. 4) are displayed in the standby state.

Then, in the sheet display region 2, when a tab is selected in response to an operation on the direction key, one-touch key, or other operation detection part 18 linked to each tab, information (second interrupted function information) showing the execution state of the interrupted application which is specified by that selected tab is displayed.

For example, the tab standby screen B of FIG. 7 displays execution information concerning URL information of a web page accessible by a web application specified by a web tab (one type of application using the communication part 11), that is, a so-called browser function, which is a function accessing a web server through the communication part 11, receiving the information concerning the web page, and displaying that received Web page in the sheet display region. The tab standby screen C displays execution information concerning transmission/reception of e-mails executed by the e-mail application (one type of application using the communication part 11) specified by the e-mail tab, the tab standby screen D displays execution information concerning utilization of various types of services using the Internet executed by the web application (one type of application using the communication part 11) specified by the web tab, and the tab standby screen E displays execution information concerning a utilization history of a position information detection application executed by a navigation application (one type of application using the communication part 11) specified by a navigation tab.

The application execution control part 121 can re-execute a clicked on interrupted application when the user select one of the tabs displayed in the tab display region 1 in response to an operation detected by the operation detection part 18 and clicks on the information showing the execution state of the interrupted application specified by this selected tab. Due to this, the user can easily re-start execution of an interrupted application from the standby state.

Further, when an operation is detected by the operation detection part 18 in an interrupted state of the web application and the tab specifying the web application is selected, the application control part 121 maintains that interrupted state each time while it accesses the web server through the communication part 11, and confirms whether the information concerning the web page received immediately before the interruption has been updated. Then, when the web page was updated, the control part receives information concerning that updated web page and displays it in the sheet display region 2, while when it was not updated, the control part displays the information concerning the web page received immediately before the interruption in the sheet display region 2 as it is. Due to this, the user can always check the information concerning the web page which was displayed immediately before interruption in the newest state even when the web application is being interrupted.

Note that, the system may be configured so that the application being interrupted is linked with one tab, and execution of the interrupted application is re-started when this tab is selected in response to an operation on an operation detection part 18. Further, the system may be configured so that information specifying the interrupted application is displayed in the display part 17 only when there is an interrupted application, but not displayed in the display part 17 when there is no interrupted application. By configuring this, improvement of the viewing property of the display part 17 can also be achieved.

Industrial Applicability

According to the present invention, it is possible to prevent the standby screen from becoming disordered along with an increase of the amount of information of the standby screen, and it is possible to improve the operability from the viewpoint of execution of functions, therefore the present invention can be applied to mobile phones and other mobile information terminals.

The invention claimed is:

1. A mobile information terminal comprising:
an operation detection part for detecting an operation;
a function execution part for executing a plurality of functions;
a display part having a first display region and a second display region;
a communication part which receives a signal; and
a control part configured to display one or more objects in the first display region and to display one or more icons in the second display region, specified by the one or more objects selected, respectively,
wherein the control part maintains the one or more objects displayed in the first display region, and changes the second display region when an object is selected in response to an operation detected by the operation detection part, and
wherein the control part emphasizes the selected object in the first display region compared with one or more other displayed selectable objects, and cancels the emphasis of the selected object when the communication part receives the signal;
wherein, when a function executed by the function execution part is interrupted, the control part displays in the first display region first interrupted function information specifying the function whose execution by the function execution part was interrupted, and displays in the second display region second interrupted function information showing the execution state of the function whose execution was interrupted; and
wherein the function execution part is configured to be able to execute a browser function receiving information concerning a web page through the communication part and displaying the received web page in the second display region of the display part, and, when an operation is detected by the operation detection part in the state where the browser function of the function execution part is interrupted and first interrupted function information specifying the browser function is selected, the control part receives information concerning the web page through the communication part again, and displays the received web page in the second display region of the display part while maintaining the interrupted state as it is.

2. A mobile information terminal as set forth in claim 1, wherein the control part executes the function specified by the selected object by the function execution part in response to an operation when an operation is detected by the operation detection part in a state where the object is selected.

3. A mobile information terminal as set forth in claim 1, wherein
the one or more icons may be changed in accordance with an execution state of a function executed by the function execution part, and
the control part displays the changed icon in the second display region when a function is executed by the function execution part and the icon is changed and the executed function is ended or interrupted.

4. A mobile information terminal as set forth in claim 1, wherein
the function execution part may execute a reception function of receiving a signal through the communication part, and
the execution information may be changed based on the signal received due to execution of the reception function by the function execution part.

5. A mobile information terminal as set forth in claim 4, wherein, when a function executed by the function execution part is ended, the control part displays in the first display region the one or more objects which had been displayed in the first display region immediately before the execution, and displays in the second display region the one or more icons which had been displayed in the second display region.

6. A mobile information terminal as set forth in claim 1, wherein, when an operation is detected by the operation detection part and second interrupted function information is selected in a state where the second interrupted function information is displayed in the second display region, the control part re-starts execution of the interrupted function which corresponds to the selected second interrupted function information.

7. A mobile information terminal as set forth in claim 1, wherein, when selection is released in response to an operation detected by the operation detection part in a state where the object is selected, the control part displays standby information in the second display region.

8. A method, comprising: displaying one or more objects in a first display region of a display part and one or more icons in a second display region of the display part, specified by the one or more objects selected, respectively;
maintaining the one or more objects displayed in the first display region, and changing the second display region, when an object is selected in response to a detected operation;
receiving a signal;
emphasizing the selected object in the first display region compared with one or more other displayed selectable objects;
cancelling the emphasis of the selected object in response to receiving the signal;
displaying in the first display region first interrupted function information specifying the function whose execution by the function execution part was interrupted, and displaying in the second display region second interrupted function information showing the execution state of the function whose execution was interrupted; and
executing a browser function receiving information concerning a web page and displaying the received web page in the second display region of the display part, and, when the browser function is interrupted and first interrupted function information specifying the browser function is selected, the control part receives information concerning the web page again, and displays the received web page in the second display region of the display part while maintaining the interrupted state as it is.

* * * * *